Figure 10:
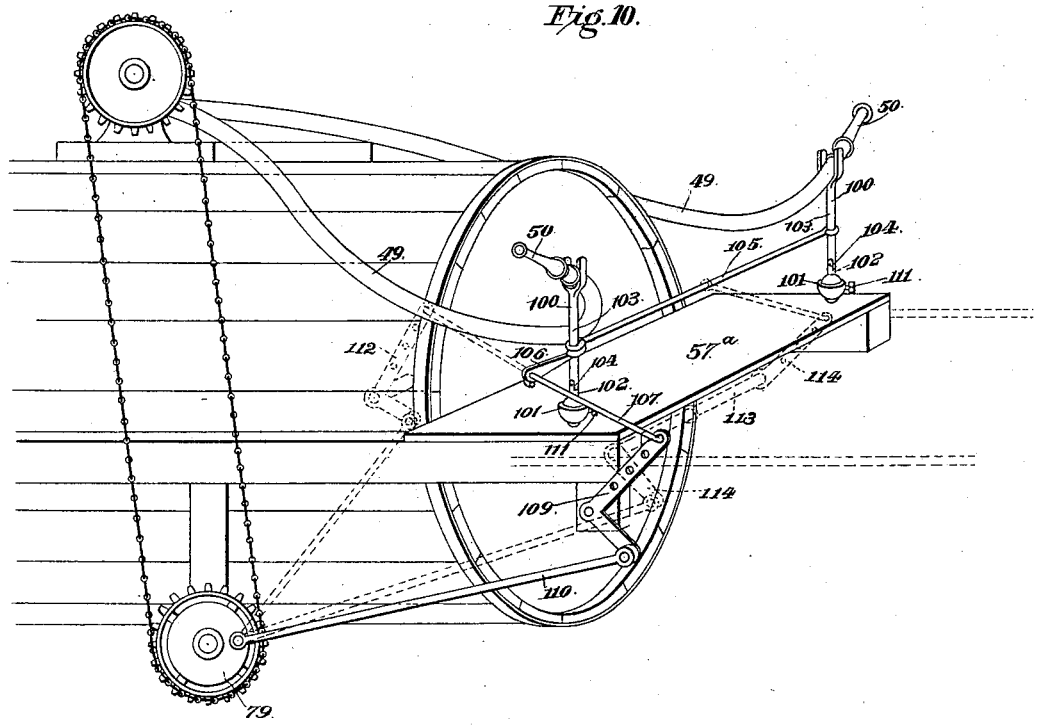

(No Model.) 4 Sheets—Sheet 1.
F. SALISBURY.
SPRAYING MACHINE.
No. 481,718. Patented Aug. 30, 1892.
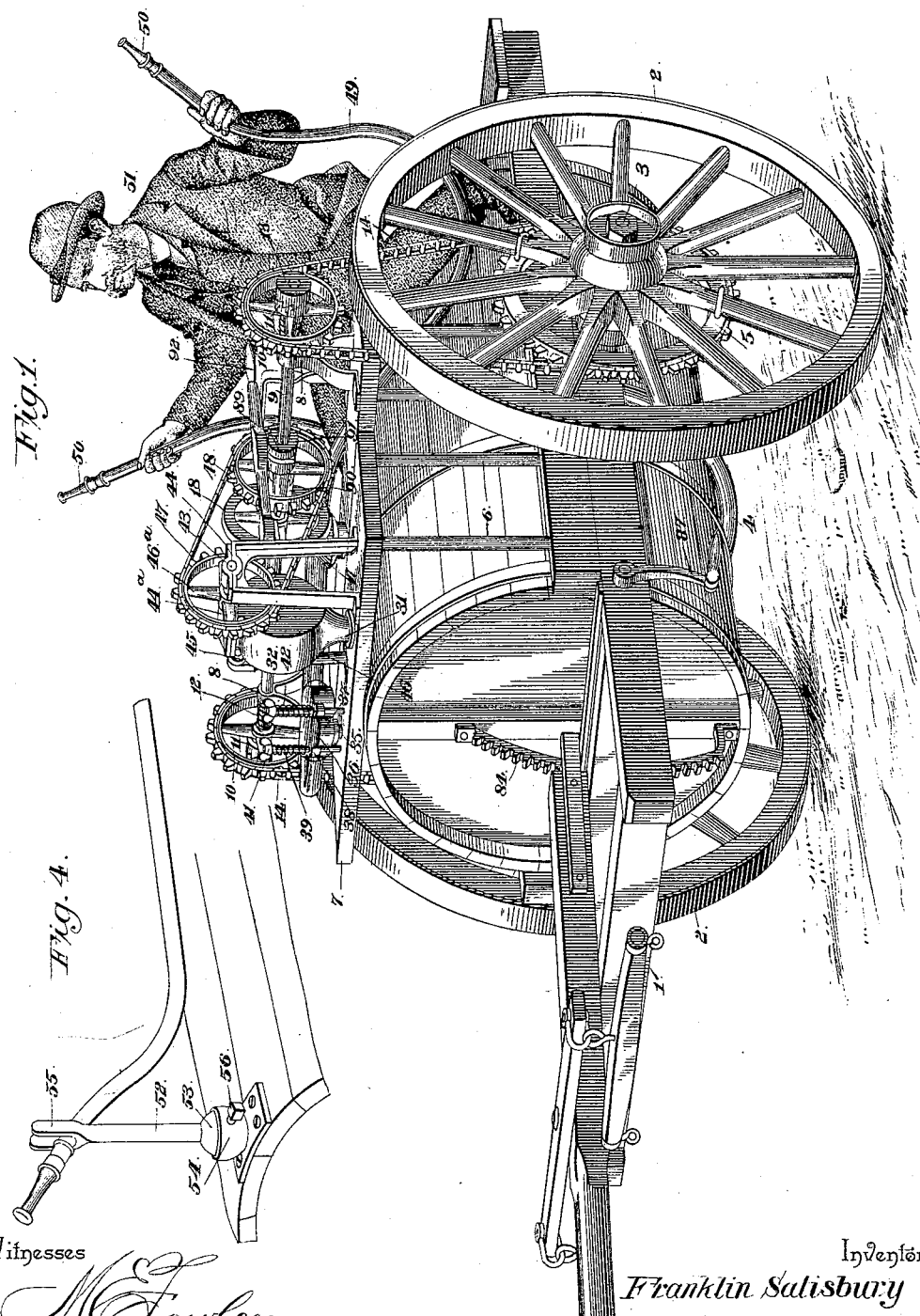
Witnesses
M. Fowler
Wm. Bagger
Inventor
Franklin Salisbury
By his Attorneys,
C. A. Snow & Co.

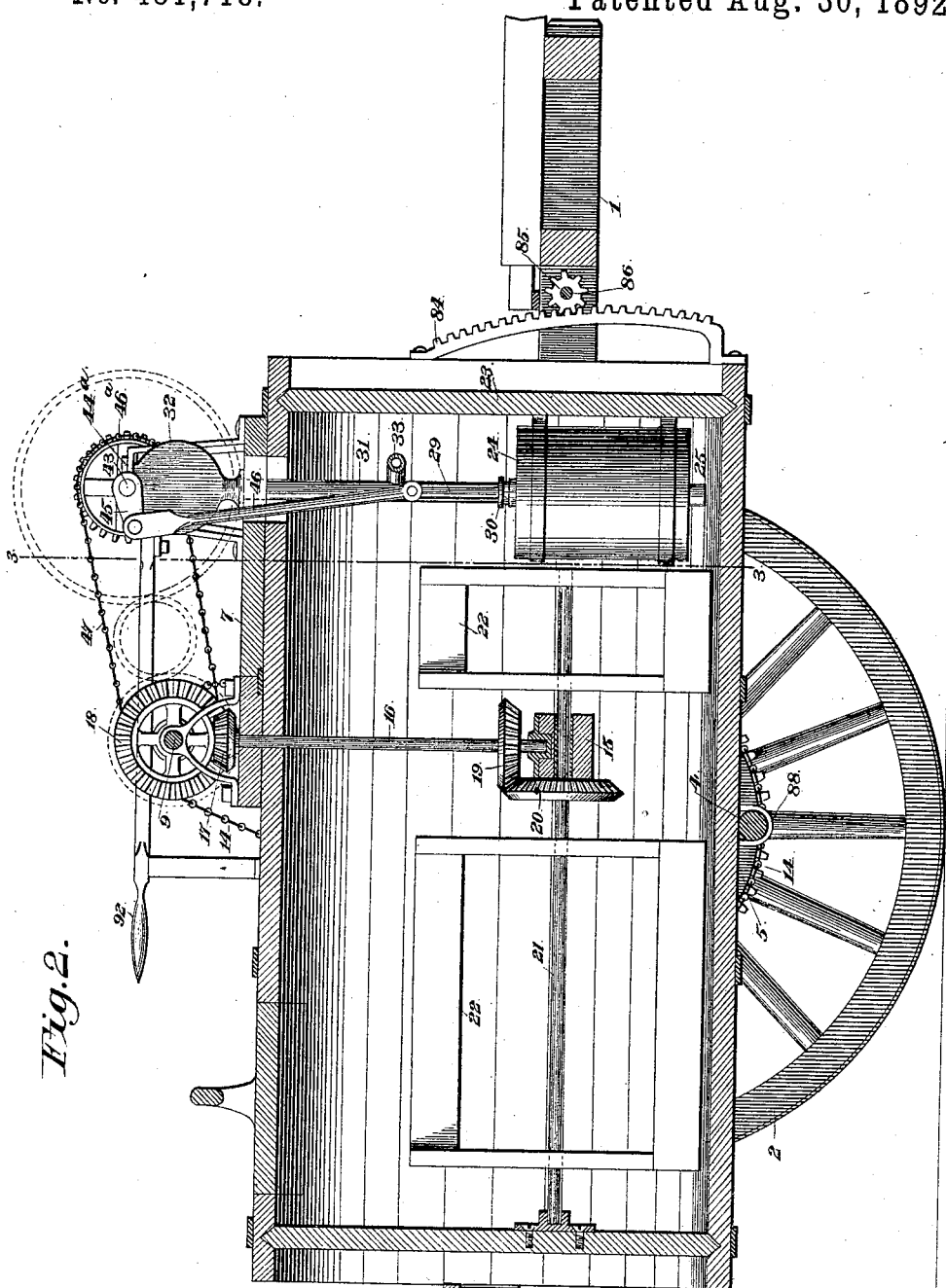

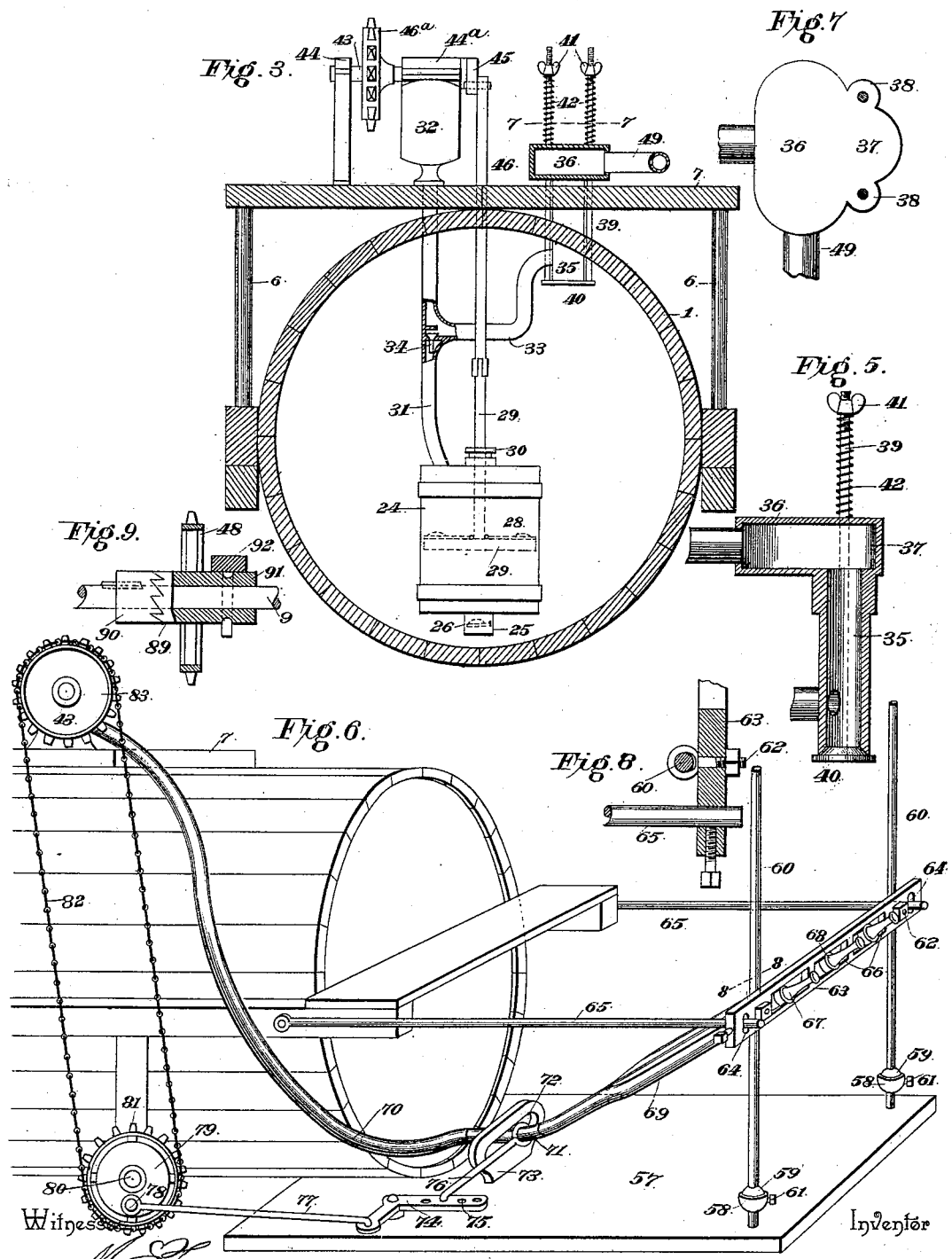

(No Model.) 4 Sheets—Sheet 4.

F. SALISBURY.
SPRAYING MACHINE.

No. 481,718. Patented Aug. 30, 1892.

Witnesses
M. Fowler
Percy C. Bowen.

Inventor
Franklin Salisbury.
By his Attorneys,
C. A. Snow & Co.

THE NORRIS PETERS CO., PHOTO-LITHO., WASHINGTON, D. C.

UNITED STATES PATENT OFFICE.

FRANKLIN SALISBURY, OF CATSKILL, NEW YORK.

SPRAYING-MACHINE.

SPECIFICATION forming part of Letters Patent No. 481,718, dated August 30, 1892.

Application filed November 11, 1890. Serial No. 371,065. (No model.)

*To all whom it may concern:*

Be it known that I, FRANKLIN SALISBURY, a citizen of the United States, residing at Catskill, in the county of Greene and State of New York, have invented a new and useful Spraying-Machine, of which the following is a specification.

This invention relates to machines for spraying fruit-trees, vines, and growing plants generally with liquids for the extermination of worms, caterpillars, beetles, moths, fluted scale or other scales, mildew, fungus, cotton and tobacco worms, and other insects and pests; and it has for its object to provide a machine of this class by means of which liquids—such as kerosene emulsions, arsenical solutions, and the like—may be applied in the form of a spray in a very rapid and effective manner and which shall be so constructed that the spray may be ejected in any desired direction, thus making the machine valuable for spraying the taller fruit-trees, as well as vines, even when—such as in the case of hop-vines—it shall be necessary to apply the spray from below in an upward direction, which is necessary for the successful extermination of pests peculiar to this plant.

My invention consists in a tank mounted upon wheels and provided with mechanism for agitating its contents and with means for forcing the said contents through suitable pipes and nozzles in a continuous jet of spray.

My invention further consists in an improved method of mounting and adjusting the said tank.

My invention further consists in means for adjustably holding and automatically vibrating the nozzles.

My invention further consists in certain details of construction which will be hereinafter fully described, and particularly pointed out in the claims.

In the drawings hereto annexed, Figure 1 is a perspective view of my improved spraying-machine, showing the same ready for operation. Fig. 2 is a longitudinal vertical sectional view of the same. Fig. 3 is a vertical transverse sectional view taken on the line 3 3 in Fig. 2. Fig. 4 is a perspective detail view showing a portion of the tank with a nozzle-holder attached thereto. Fig. 5 is a sectional detail view of the safety-valve attachment to my improved spraying-machine. Fig. 6 is a perspective detail view showing a modification consisting of a device for holding and for automatically vibrating the nozzles. Fig. 7 is a detail plan view taken on the line 7 7 in Fig. 3. Fig. 8 is a detail plan view taken on the sectional line 8 8 in Fig. 6. Fig. 9 is a sectional detail view taken through the main drive-shaft of the machine. Fig. 10 is a perspective detail view showing a modification.

Like numerals of reference indicate like parts in all the figures.

The frame of my improved machine, which is designated by 1, may be mounted upon two, three, or four wheels, as may be desired, and according to the size of the tank which is to be used. Preferably, however, only two wheels are used, inasmuch as the guiding of the machine through orchards, where the trees are planted closely together, is thereby facilitated, and this is the number which has been shown in the drawings hereto annexed. The wheels 2 are mounted upon the spindles 3 of a U-shaped axle 4, which latter is brought as low to the ground as convenient, in order that the tank, which is supported on the said frame and axle, may be prevented from tilting. I desire it to be understood, however, that instead of using the U-shaped axles stub-axles may be used, or a straight axle may be extended transversely through the tank, which latter will in this event be provided with packing-boxes to make tight joints.

Both of the wheels 2 2 are provided on the inner sides with sprocket-wheels 5, from which motion is to be transmitted to the operating parts of the machine. The frame 1 is provided with uprights 6, supporting a platform 7. The said platform is provided near its rear end with boxes 8 for the main drive-shaft 9. The latter is provided near its ends with sprocket-wheels 10, which are mounted slidingly and which are provided on their outer sides with clutch-members 11. The sprocket-wheels 10 are forced in an outward direction by suitably-arranged springs 12 to engage the clutch-members 13, which are mounted securely upon the outer ends of the shaft 9. Chains 14 connect the sprocket-wheels 10 with the sprocket-wheels 5 upon the transporting-wheels, from which motion is thus transmitted to the drive-shaft 9.

Suitable bearings are provided in the top of the tank and in a transverse bearing-brace 15 within the latter for a vertical shaft 16. The upper end of the latter has a pinion 17, meshing with a bevel-gear 18 upon the shaft 9. The lower end of the shaft 16 has a pinion 19, meshing with a bevel-gear 20, mounted upon a shaft 21, which is journaled in suitable bearings longitudinally in the tank. The shaft 21 carries suitably-constructed beaters or dashers 22, by means of which the contents of the tank is continually agitated.

Suitably arranged within the tank, near the front end of the latter, where it may, if desired, be attached to the front head 23, is a force-pump 24. Said force-pump may be a rotary pump or it may, as shown in the drawings hereto annexed, be an ordinary cylinder-pump provided with a downwardly-extending inlet-pipe 25, having an upwardly-opening check-valve 26 and provided with a reciprocating piston 27, having an upwardly-opening valve 28. The piston-rod 29 extends through a packing-box in the top of the cylinder. The top of the cylinder is also provided with an exit-pipe 31, extending upwardly through the tank and through the platform 7 and terminating at its upper end in the air-chamber 32. The pipe 31 has a branch pipe 33, below which is arranged an upwardly-opening check-valve 34. The pipe 33 opens into a depending tubular chamber 35, extending downwardly into the tank from the horizontal exit-chamber 36. The latter, which is shown in detail in Figs. 3, 5, and 7 of the drawings, is located above the platform 7, and its front portion, from which the tubular chamber 35 extends downwardly, is narrowed, as shown at 37, and provided with lugs 38, having perforations for the passage of a pair of vertically-sliding rods 39, the lower ends of which carry a valve 40, that serves to close the lower end of the cylindrical chamber 35. Upon the upper ends of the rods 39 are mounted the thumb-nuts 41, and between said nuts and the lugs 38 are coiled the springs 42, whereby the rods 39 and the valve 40 are normally forced in an upward direction to close the lower end of chamber 35. The tension of the spring 42 may be regulated by the thumb-nuts 41.

A transverse shaft 43, having its bearings in boxes 44 and 44ª, which latter is upon the upper side of the air-chamber 32, is provided at its inner end with a crank 45, connected by a pitman 46 with the upper end of the piston-rod 29 of the pump, which may thus be operated. The shaft 43 carries a sprocket-wheel 46ª, which is connected by a chain 47 with the sprocket-wheel 48 upon the drive-shaft 9. If desired, motion may be transmitted from the latter to the shaft 43 by means of spur-wheels, such as shown in dotted lines in Fig. 2 of the drawings. It is also obvious that spur-wheels or any other well-known means for transmitting motion may be substituted for the chain-gearing which has been generally shown in the drawings hereto annexed.

The discharge-pipes, of which there may be one or more, extend from the chamber 36, and said pipes may be either rigid or flexible or partly rigid or partly flexible.

In Fig. 1 of the drawings I have shown flexible pipes or hose 49, two in number, provided at their ends with suitably-constructed nozzles 50 and adapted to be held one in each hand by the operator 51, who occupies a position astride the tank, at the rear end of the latter, and who may direct the spray from the nozzles in any desired direction. A convenient seat may of course be provided, if desired.

A device by means of which the nozzles may be supported in various positions for operation has been shown in Fig. 4 of the drawings. Said device consists of a rod or upright 52, having at its lower end a ball 53, mounted in a socket 54, which is suitably secured upon the tank in any desired position. The upper or outer end of the rod 52 is bifurcated, as shown at 55, to adapt it to receive and to hold the nozzle in position for operation. Of these supporting devices any desired number may be used, according to the number of spray-pipes that are being utilized, and it will be observed that the said supporting-rods may be adjusted in the sockets 54 in such a manner that the nozzle supported therein shall be caused to project in any desired direction, a set-screw 56 being mounted in the socket 54 to retain the supporting-rod in the desired position.

Another modification has been shown in Fig. 6 of the drawings. By this modification a platform—such as 57—has been suitably mounted under the rear end of the tank. At the rear corners of said platform are mounted sockets 58, having the balls 59, provided with upwardly-extending rods 60, which may be secured in position by means of set-screws 61 in the sockets 58. Clamping-bolts 62, which are mounted upon the rod 60, carry a cross-bar 63, the ends of which are provided with vertical slots 64, through which extend the rear ends of rods 65, which are pivotally connected to the sides of the frame of the machine. The cross-bar 63 is provided with any desired number of slots 66, in which the nozzles 67 are loosely mounted, said nozzles being provided with collars 68 to retain them in the slots. The nozzles are attached to the pipes 69, which may diverge from a single conducting-pipe 70, connected with the casing 36, or the pipes 69 may be directly connected with the latter. The former construction, however, is deemed preferable and has been illustrated in the annexed drawings. The pipe 70 has a rigid portion or sleeve 71, which extends through a horizontal slot 72 in a guide-plate 73, mounted upon the platform.

74 designates a bell-crank lever suitably mounted upon the platform adjacent the guide-plate 73. One of the arms of said bell-crank lever is provided with a series of perforations 75, any one of which may be connected by a link 76 with the rigid portion or sleeve 71 of the pipe 70. The other arm of said bell-crank lever is connected by a link or pitman 77 with a wrist-pin 78 upon a disk 79, which is mounted upon a stub-axle 80, suitably attached to the frame of the machine. The disk 79 is suitably connected with the sprocket-wheel 81, which is connected by a chain 82 with the sprocket-wheel 83, which may be mounted upon the outer end of the shaft 43. It will thus be seen that motion is transmitted from the latter shaft through the sprocket-wheel 81 and disk 79 to the bell-crank lever 74, one arm of which, being connected by the link 76 with the pipe 70, serves to impart a vibrating motion to the latter and to the nozzles 67, which extend through the slots in the cross-bar 63. In this manner the spray is directed within a considerable range and it is rendered effective accordingly. It will be observed that the cross-bar 63, which supports the nozzles, may be raised or lowered within considerable limit upon the supporting-rods 60, and that the latter may be tilted forwardly or rearwardly, as may be desired, thus causing the spray to be directed either upwardly, downwardly, or, in fact, in whatever direction may be desired or deemed most desirable.

Still another modification of my invention has been illustrated in Fig. 10 of the drawings. By this modification the platform 57 has been dispensed with and the devices for supporting and vibrating the nozzles 50 50 are mounted upon a platform 57ᵃ at the rear of the machine, placed slightly higher than the platform 57.

In lieu of the slotted cross-bar 63 I use two uprights 100 100, one mounted upon each side of the platform 57 by means of a ball-and-socket joint 101 and adapted to support the nozzles 50 50 of the pipes 49 49, leading from the chamber 36. The uprights 100 100 are formed in two parts, the lower of which 102 carries the ball of the ball-and-socket joint 101, and the upper part 103 is hinged at its lower end to the part 102, as shown at 104. The upper ends of the uprights 100 100 are bifurcated to receive the nozzles 50 50, and the said uprights are connected together by a rod 105, to one end of which is secured an extension 106, which is linked by a link-rod 107 to a bell-crank lever 109, adapted to be oscillated by means of a pitman 110, suitably connected to the said bell-crank lever at one end and to a disk 79, driven by the operating mechanism of the device at its other end. Thus it will be seen that the uprights 100 100 may be adjusted in the ball-and-socket joints to throw the spray in the desired direction and held in position by the set-screws 111 111, and may also be vibrated upon the hinge-joints 104 by means of the pitman 110, bell-crank lever 109, and link-rod 107.

I do not wish to limit myself to this particular construction, as I may find it advantageous to place the bell-crank lever as shown in dotted lines at 112, or I may dispense with the bell-crank lever and use a rock-shaft 113, provided with crank-arms 114 at the ends thereof, suitably connected to the rod 105 and the disk 79, as shown in dotted lines in Fig. 10.

From the foregoing description, taken in connection with the drawings hereto annexed, the operation and advantages of my invention will be readily understood. Through a cover with which the tank is provided it is filled with the liquid which is to be sprayed. The nozzles, which may be of any desired construction, are then arranged in the desired position. Draft is attached at the front end of the machine and the latter is then ready for operation. The machine may be provided with a tongue or with thills, according to whether one or two horses are to be used. When the machine progresses, the motion is transmitted from the sprocket-wheels from the inner sides of the transporting-wheels to the main drive-shaft 9 through the sprocket-wheels 10 and the clutch mechanism. The latter, it will be observed, is so arranged that when the machine is backed the sprocket-wheels 10 will revolve loosely upon the shaft, the springs 11 yielding so as to admit of this movement. When the machine progresses, the drive-shaft 9 is rotated and motion is transmitted from the same to the shaft 21, carrying the agitators 22 within the tank and likewise to the shaft 43, by means of which the pumping mechanism is operated, as well as the mechanism shown in Fig. 6 for vibrating the nozzles when the latter mechanism is used. The liquid contents of the tank are forced by the pump through the exit-pipe 31, and through the branch 33 of the latter into the chambers 35 36, and thence through the conducting pipes and nozzles. The air-chamber 32 causes a steady and continuous stream to be emitted, and the valve 40 at the lower end of the chamber 35 acts as a safety-valve, which if the quantity of liquid forced out by the pump is too great to pass through the nozzles will open and permit the surplus to pass back into the tank. The tension of the springs holding the valve may be regulated by means of the thumb-nuts 41. By this mechanism all danger of the nozzles being blown off will be obviated. When the machine is passing up or down hills, the tank may be adjusted to a level position by means of the pinion 85, engaging the rack 84. By the same mechanism the tank may be tilted, when nearly empty, so as to admit of the entire contents being expelled by the pump. The sprocket-wheel 48 upon the shaft 9, from which motion is transmitted to the pumping mechanism, is preferably mounted loosely upon the shaft and provided with a clutch member 89, adapted to engage a clutch 90, which is mounted securely upon said shaft. The sprocket-wheel 48 is also provided with an annularly-grooved collar 91, engaged by an adjusting-lever 92, which may be readily operated to throw the sprocket-wheel 48 into or out of engagement with the clutch member 90, thus throwing the pumping mechanism into or out of gear, as may be desired. Similar mechanism may be employed, if desired, to throw the revolving shaft 21, carrying the dashers or agitators, into or out of gear.

I have in the foregoing described and illustrated what I consider to be a preferable form of my invention; but I desire it to be distinctly understood that I do not limit myself to the exact details of construction herein set forth, inasmuch as numerous modifications might be adopted without departing materially from the spirit of my invention. Notably, means different from those herein described might be adopted for transmitting motion between the different parts, all of such means being well known to mechanics. I likewise do not limit myself to any particular construction of the tank or the method of mounting the same upon two or more wheels beyond the fact that the mounting is to be such as to admit of the use of the tilting mechanism herein described.

Having described my invention, what I claim, and desire to secure by Letters Patent of the United States, is—

1. In a machine of the class described, the combination of a tank pivotally and adjustably mounted upon suitable transporting-wheels, a central transverse bearing-brace supported within the tank, a horizontal revoluble shaft journaled in one end of the tank and said central brace and carrying agitators or dashers, a vertical bevel-gear mounted upon the drive-shaft adjacent to said brace, a vertical drive-shaft projecting above the tank and having its lower end stepped in the top of said bearing-brace, said vertical shaft carrying a horizontal pinion meshing with said vertical pinion, a force-pump arranged within the tank, a horizontal crank-shaft mounted upon the top of the tank and loosely connected with the pump-piston within the tank, gearing connecting said crank-shaft with the vertical drive-shaft, and means for transmitting motion to the vertical drive-shaft from the transporting-wheels, substantially as set forth.

2. In a machine of the class described, the combination of a tank mounted upon suitable transporting-wheels, a force-pump arranged within said tank and having an exit-pipe connected with an air-chamber, a horizontal exit-chamber located above the tank and provided with a narrowed portion and a depending tubular chamber projecting from said narrowed portion into the tank and open at its lower end, spring-actuated sliding rods working on each side of the upper exit-chamber and the depending chamber, a valve carried upon the lower ends of said rods and normally closing the open lower chamber and opening into the tank, a branch pipe connecting said exit-pipe with the tubular chamber, and a spray pipe or pipes connected to the upper end of said exit-chamber, substantially as set forth.

3. In a machine of the class described, the combination of a tank mounted upon suitable transporting-wheels, a force-pump arranged within said tank, means for transmitting motion to said force-pump from the transporting-wheels of the machine, an outlet-pipe connecting said force-pump with an air-chamber and having a check-valve, a branch pipe connecting said outlet-pipe with a tubular elongated exit projecting into and above the tank and chamber, having a downwardly-opening spring-actuated valve at its lower open end in the tank, a pipe or pipes connected to the upper end of said exit-chamber and having suitably-constructed nozzles, and adjustable supporting-rods adapted to support the said nozzles and to direct the spray in different directions, substantially as set forth.

4. The combination of the tank, the force-pump within the same, the outlet-pipe, an exit-chamber or casing mounted above the tank and having the cylindrical downward extension projecting within and above the tank and provided with a valve-seat and opening into the tank, a valve mounted upon vertically-movable rods, and springs to force the valve in an upward direction, said cylindrical extension of the chamber being connected with the outlet-pipe of the pump and spray-pipes being connected with the said exit-chamber, substantially as set forth.

5. In a machine of the class described, the combination of the tank, a force-pump for expelling the contents of the latter, and a safety-valve attachment comprising a chamber or casing arranged above the tank and having a narrowed portion provided with a cylindrical extension extending into the tank, the perforated lugs formed adjacent to the narrowed portion of the casing, the vertically-sliding rods mounted in said lugs and carrying a valve that closes the lower end of the cylindrical extension, thumb-nuts mounted adjustably upon the upper ends of said rods, and springs interposed between said thumb-nuts and the perforated lugs, substantially as and for the purpose set forth.

6. In a machine of the class herein described, the combination, with a tank, of a force-pump to expel the contents of said tank, the pipe or pipes having suitably-constructed nozzles, the supporting-rods carrying slotted nozzle rests or supports loosely receiving said nozzles and also having balls at their lower ends, the sockets adapted to receive the said balls and having set-screws for retaining the latter and the supporting-rods at any desired adjustment, and means for vibrating said nozzles in said rests, substantially as and for the purpose herein set forth.

7. In a machine of the class herein described, the combination of a tank, a force-pump for expelling the contents of said tank, the pipe or pipes having suitably-constructed nozzles, means for adjustably supporting the said nozzles, and mechanism for transmitting a laterally-vibrating motion to said nozzles from the transporting-wheels upon which the tank is mounted automatically and simultaneously with the operation of the pump, substantially as set forth.

8. In a machine of the class described, the combination of a tank, a force-pump for expelling the contents of the same, the spray pipe or pipes having suitably-constructed nozzles, a movable support or supports having slotted rests loosely receiving said nozzles, a bell-crank lever located at a suitable point of attachment adjacent to said supports, and connecting-links connecting the arms of said bell-crank with the pipe or pipes and the driving mechanism of the pump, substantially as set forth.

9. In a machine of the class described, the combination of a tank, a force-pump for expelling the contents of the same, the pipe or pipes having suitably-constructed nozzles, a cross-bar mounted adjustably and having slots to support the said nozzles, a horizontally-slotted guide-plate to support the conducting-pipe, a connecting-link, a bell-crank lever, and mechanism for transmitting motion to said bell-crank lever from the transporting-wheels upon which the machine is mounted, substantially as and for the purpose set forth.

10. In a machine of the class described, the combination of a tank suitably mounted in a frame having transporting-wheels, a force-pump to expel the contents of said tank, a segmental rack upon the front end of the latter, and a shaft mounted transversely in the frame and having at its inner end a pinion engaging said rack and at its outer end a crank or hand-wheel, substantially as and for the purpose herein described.

In testimony that I claim the foregoing as my own I have hereto affixed my signature in presence of two witnesses.

FRANKLIN SALISBURY.

Witnesses:
  WM. W. BENNETT,
  FRANK H. OSBORN.